United States Patent
Gotoh et al.

(10) Patent No.: US 7,492,683 B2
(45) Date of Patent: Feb. 17, 2009

(54) INFORMATION RECORDING METHOD, INFORMATION RECORDING SYSTEM, DRIVE CONTROL UNIT, AND SEMICONDUCTOR INTEGRATED CIRCUIT FOR RECORDING INFORMATION ON A RECORDING MEDIUM HAVING A VOLUME SPACE

(75) Inventors: Yoshiho Gotoh, Osaka (JP); Tetsuhiro Kohada, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 267 days.

(21) Appl. No.: 10/558,780

(22) PCT Filed: Jun. 1, 2004

(86) PCT No.: PCT/JP2004/007920

§ 371 (c)(1), (2), (4) Date: Sep. 1, 2006

(87) PCT Pub. No.: WO2004/109691

PCT Pub. Date: Dec. 16, 2004

(65) Prior Publication Data

US 2007/0028153 A1    Feb. 1, 2007

(30) Foreign Application Priority Data

Jun. 4, 2003 (JP) ............................. 2003-159239
Jun. 4, 2003 (JP) ............................. 2003-159240

(51) Int. Cl.
*G11B 20/18* (2006.01)
*G11C 29/00* (2006.01)

(52) U.S. Cl. .................................. 369/53.17; 714/763

(58) Field of Classification Search ............. 369/53.17; 714/763
See application file for complete search history.

(56) References Cited

U.S. PATENT DOCUMENTS

| 6,510,114 B1 * | 1/2003 | Yeo et al. .................. 369/53.2 |
| 6,529,458 B1 * | 3/2003 | Shin ......................... 369/53.17 |
| 6,741,534 B1 * | 5/2004 | Takahashi et al. ........ 369/47.14 |

FOREIGN PATENT DOCUMENTS

| JP | 02-137171 | 5/1990 |
| JP | 03-113874 | 5/1991 |
| JP | 08-036846 | 2/1996 |
| JP | 2000-105980 | 4/2000 |
| JP | 2000-112674 | 4/2000 |
| JP | 2001-283438 | 10/2001 |
| WO | WO 98/14938 A1 | 4/1998 |

* cited by examiner

Primary Examiner—James C Kerveros
(74) Attorney, Agent, or Firm—Snell & Wilmer L.L.P.

(57) ABSTRACT

An information recording method for recording information on a recording medium having a volume space by a system including a drive control unit and a system control unit is disclosed. The method includes notifying the drive control unit by the system control unit of position information, recording information by the drive control unit in the spare area based on the notified position information, generating replacement information by the drive control unit on the position at which the information is recorded in the spare area, and notifying the system control unit of the replacement information, instructing the drive control unit to change management information for managing the information recorded on the recording medium based on the notified replacement information, and changing the management information based on the instruction by the drive control unit.

24 Claims, 10 Drawing Sheets

Directory

| File name | 1st cluster |
|---|---|
| P001.JPG | 3 |
| P002.JPG | 4 |
| P003.JPG | 5 |
| ... | ... |

FAT

| | |
|---|---|
| 0 | |
| 1 | |
| 2 | |
| 3 | EOF |
| 4 | EOF |
| 5 | 6 |
| 6 | EOF |
| 7 | Unused |
| 8 | |
| 9 | |

(b)

Directory

| File name | 1st cluster |
|---|---|
| P001.JPG | 3 |
| P002.JPG | 4 |
| P003.JPG | 7 |
| ... | ... |

FAT

| | |
|---|---|
| 0 | |
| 1 | |
| 2 | |
| 3 | EOF |
| 4 | EOF |
| 5 | Unused |
| 6 | EOF |
| 7 | 6 |
| 8 | |
| 9 | |

(a)

(b)

(a)

Sparing map

| Map type (=2) |
| Partition identification No. |
| Packet length |
| Length of the sparing table |
| Position of the sparing table |
| ... |

(b)

Partition map

| Map type (=1) |
| Partition identification No. |
| ... |

INFORMATION RECORDING METHOD, INFORMATION RECORDING SYSTEM, DRIVE CONTROL UNIT, AND SEMICONDUCTOR INTEGRATED CIRCUIT FOR RECORDING INFORMATION ON A RECORDING MEDIUM HAVING A VOLUME SPACE

TECHNICAL FIELD

The present invention relates to an information recording system including a drive control unit and a system control unit, an information recording method for recording information on a recording medium having a volume space using the information recording system, the drive control unit, and a semiconductor integrated circuit.

BACKGROUND ART

An information recording system for recording information on an optical disc includes a drive control unit and a system control unit. An optical disc includes an area which is managed by the drive control unit (for example, a lead-in area, a lead-out area) and an area which is managed by the system control unit (for example, a volume space). In some optical discs, a spare area for defect management is not pre-assigned in an area which is managed by the drive control unit.

Optical discs are, for example, DVD-RW discs and DVD-RAM discs.

An information recording system, for example, assigns a spare area in a volume space included in a DVD-RW disc. The volume space included in the DVD-RW disc is managed by a file system based on the UDF Specification. A system control unit refers to the file system and performs defect management at the time of data recording. Position information in the spare area and mapping information of the data which is recorded in the spare area are recorded in a sparing table which is recorded on the DVD-RW disc. (See, for example, the UDF Specification, "Optical Storage Technology Association, Universal Disc Format Specification, Revision 2.00, Apr. 3, 1998, page 31, http://www.osta.org").

However, the information recording system cannot assign a spare area in a lead-in area included in the DVD-RW disc (an area which is managed by the drive control unit), and so the drive control unit cannot perform defect management. Therefore, the system control unit performs the defect management. As a result, the number of times that commands are issued between the system control unit and the drive control unit increases, which decreases the performance at the time of data recording.

The information recording system, for example, assigns a spare area in a lead-in area included in a DVD-RAM disc. The lead-in area included in the DVD-RAM disc is managed by the drive control unit, and the drive control unit performs defect management. Therefore, the performance of the information recording system at the time of data recording is high. The information recording system can assign a spare area of a fixed size in an inner area of the DVD-RAM disc, and can assign a spare area of an expandable size in an outer area of the DVD-RAM disc. (See, for example, Japanese Patent No. 3090320, pages 27 to 29 and FIG. 8.)

When a spare area larger than the lead-in area is necessary, the lead-in area needs to be expanded. Expansion of the lead-in area requires the size of the volume space to be changed and so is difficult.

The present invention, for solving the above-described problem, has an objective of providing an information recording system including a drive control unit and a system control unit for notifying the drive control unit of position information which indicates a position of a spare area assigned in a volume space, an information recording method for recording information on a recording medium having the volume space using the information recording system, the drive control unit, and a semiconductor integrated circuit.

DISCLOSURE OF THE INVENTION

An information recording method according to the present invention for recording information on a recording medium having a volume space by a system including a drive control unit and a system control unit includes the steps of (a) the system control unit notifying the drive control unit of position information which indicates a position of a spare area assigned in the volume space; (b) the drive control unit recording information, which is to be recorded in a defective area, in the spare area based on the notified position information; (c) the drive control unit generating replacement information on the position at which the information is recorded in the spare area, and notifying the system control unit of the replacement information; (d) the system control unit instructing the drive control unit to change management information for managing the information recorded on the recording medium based on the notified replacement information; and (e) the drive control unit changing the management information based on the instruction. By this, the above-described objective is achieved.

Step (a) may further include the step of the system control unit assigning the spare area in the volume space.

The management information may be file management information for managing a file recorded on the recording medium.

Step (d) may further include the step of the system control unit copying the information, recorded in the spare area, in an area which is a part of the volume space and is different from the spare area, based on the notified replacement information. The spare area may be managed by the system control unit.

Step (d) may further include the step of the system control unit copying the information, recorded in the spare area, in a prescribed area which is a part of the volume space, based on the notified replacement information.

The method may further include the steps of searching for position information of a pre-replacement area regarding the replacement information; and changing the found position information of the pre-replacement area to information which indicates a recording position at which the information is recorded in the spare area.

The file management information may record position information of each of extents in the form of a table, and an extent may be a continuous area in which a file is recorded.

The system control unit may hold the changed information indicating the recording position.

Step (a) may further include the step of the system control unit selecting an area having fewer defective areas in the volume space as the spare area.

The recording medium may have a defect management list managed by the drive control unit recorded thereon. The method may further include the step of the drive control unit registering position information which indicates the defective areas in the defect management list.

The management information may be a sparing table for recording the replacement information.

The method may further include the steps of the system control unit instructing the drive control unit to change a partition map after step (a) in order to match the recording medium to a recording medium having the sparing table not recorded thereon; and the drive control unit changing the partition map in accordance with the instruction to change.

The recording medium may have a defect management list managed by the drive control unit. The method may further include the step of the drive control unit registering position information, indicating a position of a defective area detected when the information is recorded, in the defect management list.

A system according to the present invention for recording information on a recording medium having a volume space includes a drive control unit; and a system control unit. The system control unit comprises (a) means for notifying the drive control unit of position information which indicates a position of a spare area assigned in the volume space. The drive control unit comprises (b) means for recording information, which is to be recorded in a defective area, in the spare area based on the notified position information; and (c) means for generating replacement information on a position at which the information is recorded in the spare area, and notifying the system control unit of the replacement information. The system control unit further comprises (d) means for instructing the drive control unit to change management information for managing the information recorded on the recording medium based on the notified replacement information. The drive control unit further comprises (e) means for changing the management information based on the instruction. By this, the above-described objective is achieved.

The means for notifying the drive control unit may further include means for assigning the spare area in the volume space.

The management information may be file management information for managing a file recorded on the recording medium.

The management information may be a sparing table for recording the replacement information.

An information recording method according to the present invention for recording information on a recording medium having a volume space by a drive control unit structured so as to receive notification from a system control unit includes the steps of (a) the drive control unit recording information, which is to be recorded in a defective area, in a spare area, based on position information which indicates a position of the spare area assigned in the volume space, the position information being notified by the system control unit; (b) the drive control unit generating replacement information on the position at which the information is recorded in the spare area, and notifying the system control unit of the replacement information; and (c) the drive control unit changing the management information in accordance with an instruction received from the system control unit which instructs the drive control unit to change management information for managing the information recorded on the recording medium based on the notified replacement information. By this, the above-described objective is achieved.

The management information may be file management information for managing a file recorded on the recording medium.

The management information may be a sparing table for recording the replacement information.

A drive control unit according to the present invention for recording information on a recording medium having a volume space is structured so as to receive notification from a system control unit. The drive control unit includes (a) means for recording information, which is to be recorded in a defective area, in a spare area, based on position information which indicates a position of a spare area assigned in the volume space, the position information being notified by the system control unit; (b) means for generating replacement information on the position at which the information is recorded in the spare area, and notifying the system control unit of the replacement information; and (c) means for changing the management information in accordance with an instruction received from the system control unit which instructs the drive control unit to change management information for managing the information recorded on the recording medium based on the notified replacement information. By this, the above-described objective is achieved.

The management information may be file management information for managing a file recorded on the recording medium.

The management information may be a sparing table for recording the replacement information.

A semiconductor integrated circuit for according to the present invention for controlling recording of information on a recording medium having a volume space is structured so as to receive notification from a system control unit. The semiconductor integrated circuit includes (a) means for recording information, which is to be recorded in a defective area, in a spare area, based on position information which indicates a position of a spare area assigned in the volume space, the position information being notified by the system control unit; (b) means for generating replacement information on the position at which the information is recorded in the spare area, and notifying the system control unit of the replacement information; and (c) means for changing the management information in accordance with an instruction received from the system control unit which instructs the semiconductor integrated circuit to change management information for managing the information recorded on the recording medium based on the notified replacement information. By this, the above-described objective is achieved.

BRIEF DESCRIPTION OF THE DRAWINGS

FIG. 5 shows a data structure of file management information in a FAT format.

DETAILED DESCRIPTION

Hereinafter, embodiments of the present invention will be described by way of drawings.

EXAMPLE 1

In a first example of the present invention, an optical disc in which no spare area is assigned will be described.

Figure 1:
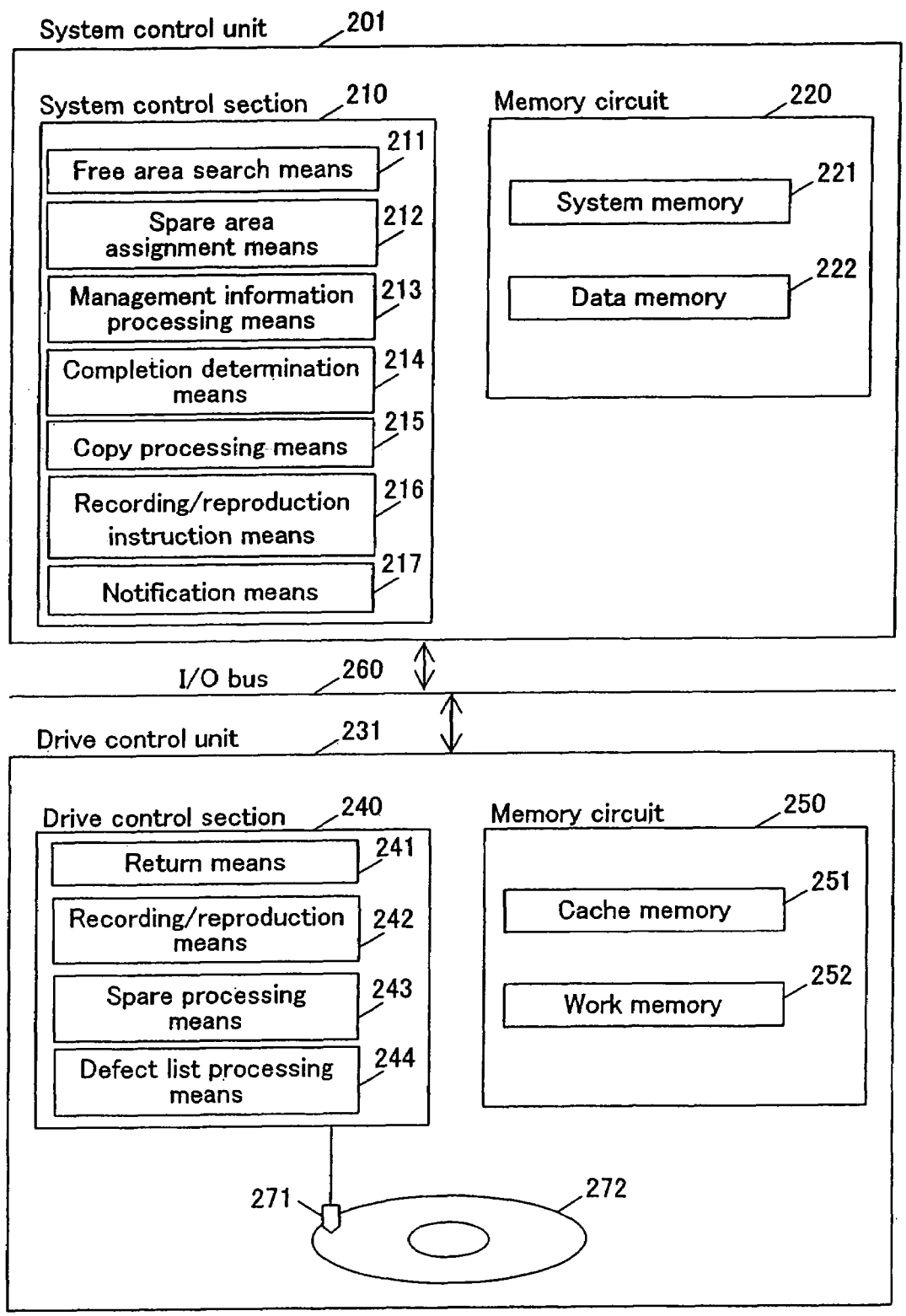
FIG. 1 shows an information recording system 200 according to a first example of the present invention.

FIG. 1 shows an information recording system 200 according to the first example of the present invention.

The information recording system 200 includes a system control unit 201, and a drive control unit 231 on which an optical disc 272 is mountable. The system control unit 201 and the drive control unit 231 are connected to an I/O bus 260.

The information recording system 200 is, for example, a personal computer-based system or a consumer-use optical disc video recorder. In the case where the information recording system 200 is a personal computer-based system, the system control unit 201 is a main body of the personal computer, and the drive control unit 231 is an optical disc drive as a peripheral device. In the case where the information recording system 200 is a consumer-use optical disc video recorder, the system control unit 201 is, for example, a system control board, and the drive control unit 231 is, for example, an optical disc drive having a minimum necessary constituent.

The system control unit 201 includes a system control section 210 and a memory circuit 220 for temporarily storing data.

The system control section 210 is, for example, a microcomputer or a CPU. The system control section 210 includes free area search means 211 for searching for a free area of the optical disc, spare area assignment means 212 for assigning a spare area, management information processing means 213 for generating or changing management information, completion determination means 214 for determining whether or not data recording has been completed, copy processing means 215, recording/reproduction instruction means 216 for instructing the drive control unit 231 to record and/or reproduce data, and notification means 217 for notifying the drive control unit 231 of various information.

The copy processing means 215 instructs the drive control unit 231 to read data recorded in a spare area and to record the read data in a different area.

The memory circuit 220 includes a system memory 221 and a data memory 222 for temporarily storing data. The system memory 221 is a work memory used, for example, by the system control section 210 to perform arithmetic operation processing or analysis processing.

The drive control unit 231 includes a drive control section 240, a memory circuit 250 for temporarily storing data, and a pickup 271.

The drive control section 240 is, for example, a microcomputer or a DSP. The drive control section 240 controls the pickup 271 to record data on, and/or reproduce data from, the optical disc 272.

The drive control section 240 includes return means 241 for returning data to the system control unit 201, recording/reproduction means 242 for recording data on, and/or reproducing data from, a prescribed area, substitution processing means 243 for performing verification processing, and defect list processing means 244 for registering position information of a defective sector in a defect management list. The drive control section 240 is produced as, for example, a one-chip LSI (semiconductor integrated circuit) or a part thereof. In the case where the drive control section 240 is produced as a one-chip LSI, the production process of the drive control unit 231 and the information recording system 200 can be made easier.

The memory circuit 250 includes a cache memory 251 used for efficiently processing data which is recorded and/or reproduced by the drive control section 240 and a work memory 252 used for performing arithmetic operations or the like.

The memory circuit 220 and the memory circuit 250 may be formed by dividing one physical memory circuit into a plurality of memory areas. In that case, one of the plurality of memory areas is assigned as the memory circuit 220 and another one of the plurality of memory areas is assigned as the memory circuit 250.

Figure 2:
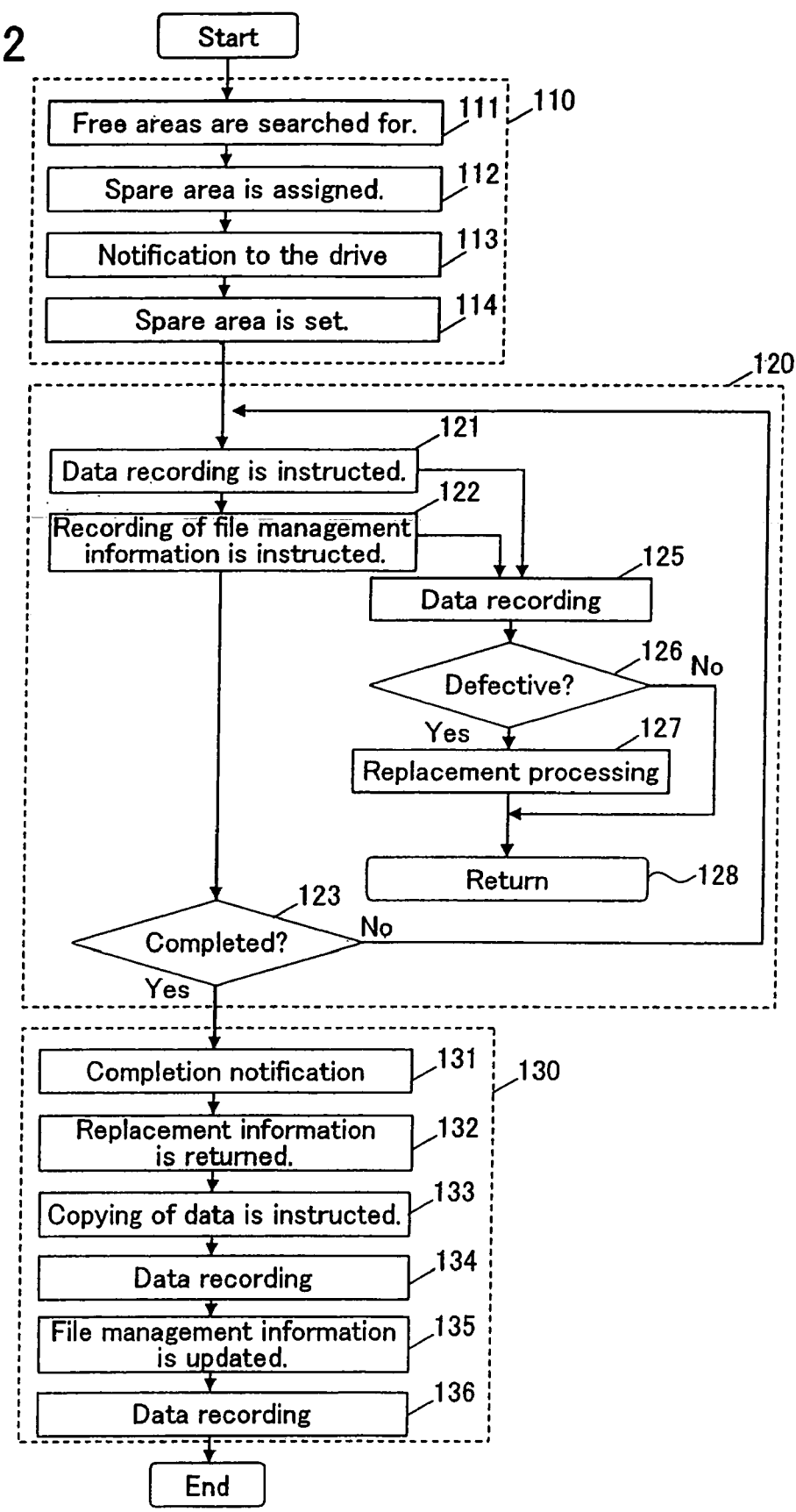
FIG. 2 is a flowchart illustrating a recording method according to the first example of the present invention.

FIG. 2 shows a recording method according to the first example of the present invention. The recording method according to the first example of the present invention includes a spare area assignment processing sequence 110, a data recording processing sequence 120, and a completion processing sequence 130.

Figure 3:
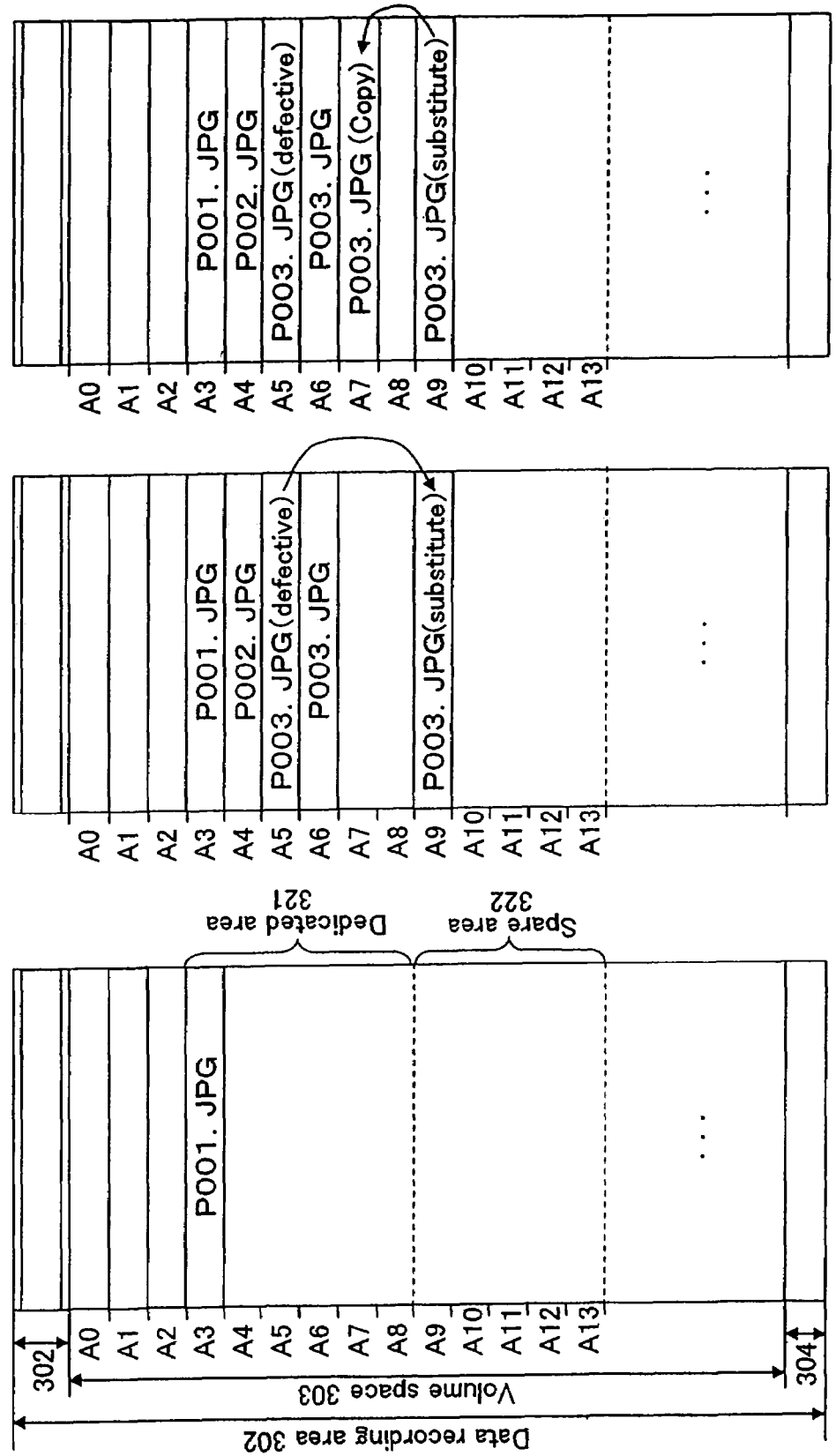
FIG. 3 shows a data structure recorded on an optical disc by the recording method according to the first example of the present invention.

FIG. 3 shows a data structure recorded on the optical disc by the recording method according to the first example of the present invention.

FIG. 3, part (a), shows a data structure recorded on the optical disc after the spare area assignment processing sequence 110 is performed. In the spare area assignment processing sequence 110, a spare area 322 is assigned such that the drive control unit 231 records data in the spare area 322 by a linear replacement system.

A recording area of the optical disc includes a data recording area 301. The data recording area 301 is a data recordable area of the optical disc. The data recording area 301 includes a lead-in area 302 and a lead-out area 304 which are managed by the drive control unit 231 and a volume space 303 which is managed by the system control unit 201.

In the lead-in area 302, a defect management list area 310 is assigned. The drive control unit 231 records a defect management list in the defect management list area 310. The defect management list includes defect management information (for example, a list of addresses of defective sectors which are detected in the volume space 303). In the volume space 303, an address is assigned for each logical sector. In this example, for the sake of simplicity, explanation will be done for, each group of areas designated as address A0 through An. Data is recorded in the volume space 303 as a file, and the file is managed by file management information which is recorded in a file management information area 320. At address A3, file P001.JPG is pre-recorded. As appreciated by this, no spare area is set in an area which is managed by the drive control unit (i.e., the lead-in area 302 or the lead-out area 304).

FIG. 3, part (b), shows a data structure recorded on the optical disc after the data recording processing sequence 120 is performed. The information recording system 200 refers to the file system, and thus records file P002.JPG in an area represented by address A4 and records file P003.JPG in an area represented by address A5 and an area represented by address A6.

File P003.JPG has a large size. Therefore, the first half of file P003.JPG is recorded in the area represented by address A5 and the second half thereof is recorded in the area represented by address A6. The first half and the second half of file P003.JPG should be recorded continuously. However, a verification of the data recorded by the drive control unit 231 shows that the area represented by address A5 is defective, and thus the first half of file P003.JPG is recorded in an area represented by address A9 as a spare area.

FIG. 3, part (c), shows a data structure recorded on the optical disc after the completion processing sequence 130 is performed. The information recording system 200 follows the replacement information to copy the data recorded in the area represented by address A9 to an area represented by address A7. The replacement information indicates that the data, which should be recorded in the area represented by address A5, has actually been recorded in the area represented by address A9 among the spare areas 322. Specifically, the system control unit 201 instructs the drive control unit 231 to read the data recorded in the area represented by address A9 and to record the data in the area represented by address A7.

In the case where the system control unit 201 instructs the drive control unit 231 to perform recording/reproduction of data which was to be recorded at a pre-replacement address, the information obtained from the drive control unit 231 may be the pre-replacement address. For example, the system control unit 201 may instruct the drive control unit 231 to read the data from the area represented by address A5 and record the data in the area represented by address A7. The reason is that the drive control unit 231 knows that address A5 is replaced by address A9.

When the data recorded in the spare area is completely copied, the recording position of the file is changed to address A7, to which the data has been copied, and the file management information is recorded in the file management information area 320.

Hereafter, the recording method according to the first example of the present invention will be described step by step with reference to FIGS. 2 and 3.

The spare area assignment processing sequence 110 will be described in detail below.

The spare area assignment processing sequence 110 is carried out by steps 111 through 114. The spare area assignment processing sequence 110 is a pre-processing sequence of data recording. In the spare area assignment processing sequence 110, the spare area 322 used as a spare area in which data is to be recorded by the drive control unit 231 is assigned.

Step 111: The free area search means 211 searches for an free area in the volume space 303 based on the file management information recorded in the file management information area 320 at address A1. The free area search means 211 follows the file management information to perform a search in areas at address A9 and thereafter (see FIG. 3, part (a)). The reason why the search is performed in the areas at address A9 and thereafter is that dedicated areas 321 are assigned in areas represented by addresses A3 through A8.

Step 112: The spare area assignment means 212 assign spare areas in free areas which are closest to the dedicated areas 321, among the free areas which have been found. Therefore, in the subsequent step, there is no instruction to record data in the spare area by the file system.

Step 113: The notification means 217 notifies the drive control unit 231 that the spare areas have been assigned in areas represented by address represented by addresses A9 through A13.

Step 114: The drive control unit 231 sets the notified areas as the spare areas.

As described above, the system control unit 201 can refer to the file system to search for free areas in the volume space and assign spare areas in the free areas in the volume space.

The spare area assignment processing sequence 110 may further include an additional step. In the additional step, the system control unit 201 refers to the file system, and thus obtains the defect management information recorded in the lead-in area 302 from the drive control unit 231 and assigns spare areas in areas having few defective sectors. In the case where the spare area assignment processing sequence 110 includes the additional step, the defective sectors can be pre-detected before data is recorded in a spare area. This decreases the frequency at which the data is recorded at a different area in the spare areas.

The spare area assignment processing sequence 110 may be carried out, for example, after the optical disc is loaded on the drive control unit 231, but the timing of carrying out the spare area assignment processing sequence 110 is not limited to this. The spare area assignment processing sequence 110 may be carried out, for example, when only a few number of used areas are left in the spare areas as a result of the drive control unit 231 recording data in the spare areas. Another spare area may be assigned in accordance with the frequency at which data is recorded in a spare area.

The data recording processing sequence 120 will be described in detail below.

The data recording processing sequence 120 is carried out by steps 121 through 128. In the data recording processing sequence 120, the drive control unit 231 performs defect management processing while performing recording processing of the data recorded in the data memory 222.

Step 121: When an instruction from the user or an application requires the data recorded in the data memory 222 to be recorded on the optical disc, the free area search means 211 searches for a free area which is necessary for recording the data. The recording/reproduction instruction means 216 instructs the drive control unit 231 to record the data, recorded in the data memory 222, in the free area which has been found.

Step 125: The recording/reproduction means 242 records the data transferred from the data memory 222 in the instructed free area. In this step, the data transferred from the data memory 222 is once stored in the cache memory 251 in the drive control unit 231 and the recording processing is temporarily in a wait state. The reason is that for recording a plurality of pieces of data in continuous areas, it is faster to record data continuously than to record data one by one. FIG. 2 shows that data reading and defect management are performed sequentially, but actually, data recording, data reading, and defect management are scheduled to be executed parallel in units of related pieces of data. Accordingly, the defect management performed by the drive control unit 231 realizes higher performance at recording than the defect management performed with reference to the file system.

Step 126: The replacement processing means 243 performs verification processing. More specifically, the replacement processing means 243 reads the recorded data and compares the read data with the pre-recording data. When the recorded data cannot be read or is different from the pre-recording data, the logical sector in which the data has been recorded is determined as a defective sector. When an error occurs while data is recorded, the logical sector in which the data is to be recorded is determined as a defective sector.

When the logical sector is determined as being defective (Yes), the processing proceeds to step 127. When the logical sector is determined as being not defective (No), the processing proceeds to step 128.

Step 127: The data to be recorded is recorded in an unused area among the spare areas 322. The defect list processing means 244 registers position information of the defective sector in the defect management list which is recorded in the defect management list area 310.

For recording data in a spare area, verification processing is performed. More specifically, the recorded data is read and the read data is compared with the pre-recording data. When the recorded data cannot be read or is different from the pre-recording data, the data is recorded in a different area among the spare areas.

When the data is instructed to be recorded in the logical sector registered in the defect management list, the drive control unit 231 may directly record the data in a spare area instead of recording the data in the logical sector. In this case, the data can be efficiently recorded. Mapping information, indicating the address of the logical sector in which the data is to be recorded and the address of the logical sector in the spare area in which the data has actually been recorded, is held in the work memory 252.

The information recording system 200 repeats steps 121 and 125 through 128. When the data recording is completed, the processing proceeds to step 122. In the repetition loop of steps 121 and 125 through 128, step 128 means the return to step 121.

Step 122: The management information processing means 213 creates management information on the recording position of the data, the file name, and the like in order to manage the recorded data in the form of a file. Even if the drive control unit 231 records data in a spare area at this point, the file system is not aware thereof. Therefore, the management information of the file is created as if the data was recorded at an address instructed by the file system. The recording/reproduction instruction means 216 instructs the drive control unit 231 to record the data in a prescribed logical sector in order to update the file management information.

The information recording system 200 repeats steps 122 and 125 through 128. When the recording of the file management information is completed, the processing proceeds to step 123. In the repetition loop of steps 122 and 125 through 128, step 128 means the return to step 122.

Step 123: The completion determination means 214 determines whether or not the data recording has been completed. When, for example, the user instructs the optical disc to be removed, the completion determination means 214 determines that the data recording has been completed.

As described above, the information recording system 200 refers to the file system, and records file P002.JPG in an area represented by address A4 and records file P003.JPG in an area represented by address A5 and an area represented by address A6 (see FIG. 3, part (b)).

File P003.JPG has a large size. Therefore, the first half of file P003.JPG is recorded in the area represented by address A5 and the second half thereof is recorded in the area represented by address A6. The first half and the second half of file P003.JPG should be recorded continuously. However, a verification of the data recorded by the drive control unit 231 shows that the area represented by address A5 is defective, and thus the first half of file P003.JPG is recorded in an area represented by address A9 as a spare area (see FIG. 3, part (b)).

The completion processing sequence 130 will be described in detail below.

The completion processing sequence 130 is carried out by steps 131 through 136. In the completion processing sequence 130, in the case where data is recorded in a spare area, the file management information managed by the file system is matched with information indicating the position at which the data has actually been recorded, and an area assigned as the spare area is released. The term "release" means that the element managing a prescribed area is changed from the drive control unit 231 to the system control unit 201.

Step 131: Based on the determination of the completion determination means 241, the notification means 217 notifies the drive control unit 231 that the data recording processing has been completed.

Step 132: The return means 241 in the drive control unit 231 returns the mapping information of recording in a spare area, which has been held in the work memory 252, to the system control unit 201.

Step 133: Based on the returned mapping information, the free area search means 211 in the system control unit 201 searches for a free area which is close to the area in which the data was originally to be recorded. The copy processing means 215 instructs the drive control unit 231 to read the data recorded in the spare area and record the read data in the free area which has been searched.

Step 134: The recording/reproduction means 242 in the drive control unit 231 follows the instruction of the copy processing means 215 to read the data recorded in the spare area and record the read data.

Step 135: The management information processing means 213 changes the position information on the position at which the file was originally to be recorded into the position information of the position at which the data has been copied. The management information processing means 213 then instructs the drive control unit 231 to record the file management information.

Step 136: The recording/reproduction means 242 in the drive control unit 231 follows the instruction to record the data.

As described above, the information recording system 200 follows the replacement information to copy the data recorded in the area represented by address A9 to the area represented by address A7. The replacement information indicates that the data, which should be recorded in the area represented by address A5, has actually been recorded in the area represented by address A9 among the spare areas 322. Specifically, the system control unit 201 instructs the drive control unit 231 to read the data recorded in the area represented by address A9 and to record the data in the area represented by address A7.

As described above, the data recorded in a spare area can be copied to an area outside the spare area. Therefore, the spare area can be released as being unused.

In the case where the dedicated areas 321 include a free area, the data recorded in the spare area may be copied in an area among the dedicated areas 321. In this case, the number of accesses to the optical disc required for reading a plurality of prescribed files is reduced, which increases the efficiency of data reading.

In this example, the data recorded in a spare area is copied to a different area. The copying processing is not absolutely necessary. When the data is not copied, it is sufficient to update the position information, in the file management information, corresponding to the data recorded in the spare area. This shortens the time necessary for carrying out the completion processing sequence 130.

The file system may manage the defective sectors detected by the drive control unit 231 as a file which is a collection of defective sectors. In a table or bit map for managing the free areas as the file management information, the defective sectors detected by the drive control unit 231 may be treated as unused areas.

Hereinafter, a method for updating the file management information by carrying out the completion processing sequence 130 will be described.

Figure 4:
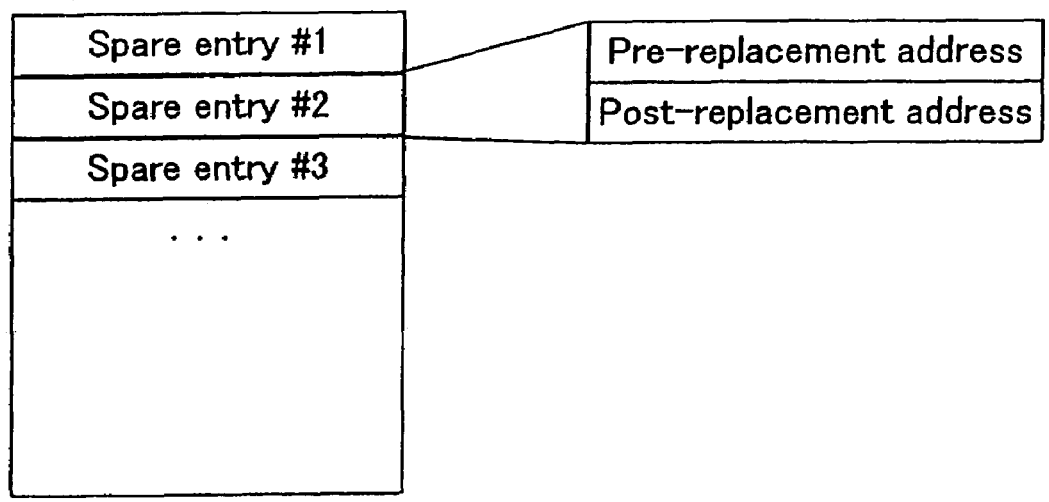
FIG. 4 shows a data structure of replacement information which is generated by a drive control unit 231.

FIG. 4 shows a data structure of replacement information generated by the drive control unit 231.

The replacement information has a table-like data structure in which spare entries are arranged side by side. A spare entry is added to the replacement information each time the drive control unit 231 records data in a spare area. A spare entry includes a pre-replacement address of an area in which the data should be recorded but was not, and an post-replacement address of an area in which the data has actually been recorded. For example, address A5 is registered as a pre-replacement address, and address A9 is registered as a post-replacement address (see FIG. 3, part (b)).

FIG. 5 shows a data structure of file management information in a FAT format.

As a result of carrying out the data recording processing sequence 120, files P001.JPG, P002.JPG and P003.JPG are recorded in a directory (see FIG. 5, part (a)). In each of entries of the directory, the number of a first cluster corresponding to the file name of each file is recorded. The numbers of the first cluster corresponding to files P001.JPG, P002.JPG and P003.JPG are "3", "4" and "5", respectively. In the FAT format, an entry is registered for each cluster of a fixed size corresponding to a logical sector. In this example, for the sake of simplicity, an area represented by address Ai will be explained as a cluster.

As a result of carrying out the data recording processing sequence 120, "EOF", "EOF", "6", "EOF" and "unused" are registered in the entries of the FAT corresponding to clusters A3 through A7, respectively. "6" is registered in the entry of the FAT corresponding to cluster A5. This means that the data of file P003.JPG is recorded in the areas represented by addresses A5 and A6. "EOF" is a code representing the end of a file.

While the completion processing sequence 130 is being carried out, the file system is referred to, and the replacement information (see FIG. 4) is received and it is recognized that the area represented by address A5 is spared by an area represented by another address. Then, the entry corresponding to pre-replacement address A5 is read from the FAT. Since the cluster corresponding to address A5 is possibly an intermediate cluster, an entry designating address A5 as the next cluster is searched for from the FAT.

When the entry designating address A5 is found, an entry designating that cluster is searched from in the FAT. Since there is no entry designating address A5 (FIG. 3), it is appreciated that address A5 is the first cluster.

Next, an entry of the directory designated as the first cluster is searched for. The first cluster of the entry of file P003.JPG designates address A5. At this point, it is appreciated that the data recorded in a spare area is the first half of file P003.JPG.

As a result of the completion processing sequence 130, the data recorded in an area represented by address A9 is copied to an area represented by address A7 among the dedicated areas. This is the copying processing of the data recorded in the spare area. For updating the file management information, the number of the first cluster of the entry corresponding to file P003.JPG in the directory is changed to "7", and the entry in the FAT corresponding to address A7 is changed to "6" (see FIG. 5, (b)). In addition, the entry in the FAT corresponding to address A5 is changed to "unused" (see FIG. 5, (b)).

As described above, the position information on the position at which the data is recorded and link information thereof are searched for regarding each address of an area in which data is recorded as a spare area. In addition, the file, the data of which is recorded in a spare area, is also checked. Thus, the position information, in the file, on the position of the pre-replacement area is searched for, and the position information of the related file is updated to the information on the area to which the data recorded in the spare area has been copied. In this manner, the file management information can be updated.

Hereinafter, a method for efficiently updating the position information of a file by referring to the data structure of the file management information according to the present invention will be described.

Figure 6:
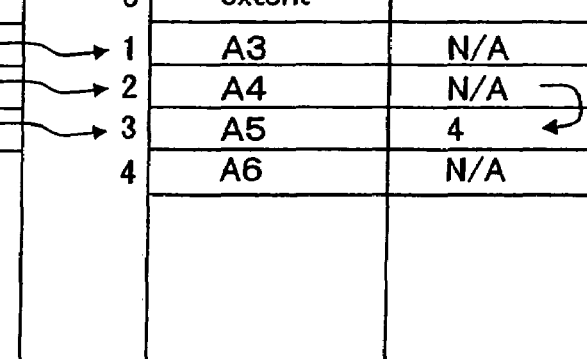
FIG. 6 shows a data structure of the file management information.
Figure 6:
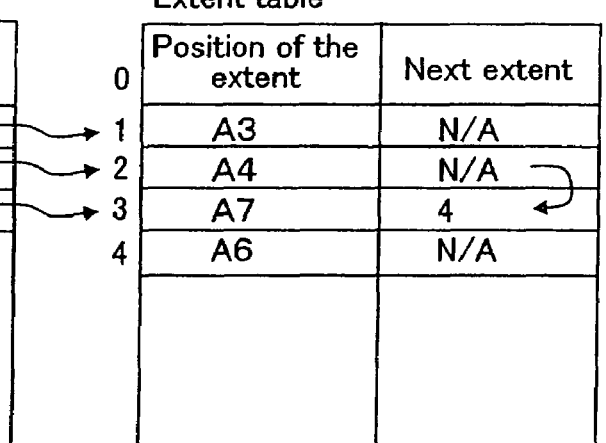

FIG. 6 shows a data structure of the file management information.

In a directory, the names of the files or the names of the sub-directories, which are to be recorded in the directory, are recorded. In the directory, the entry numbers of the extent table regarding the files, or the entry numbers of the extent table regarding the sub-directories, are also recorded. An entry number is a number assigned for each entry in the extent table. In the extent table, the position information of the extent of a file is recorded for each entry. In the case where a file is recorded in a plurality of divided extents, the number of the entry representing the next extent is also recorded in the extent table. "N/A" means that no effective value is designated (FIG. 6).

In a data structure of the file management information in the FAT format, each entry represents a cluster of a fixed size. In the data structure of the file management information shown in FIG. 6, each entry represents the position information on an extent. Here, an "extent" represents a continuous area. Since the position information on an extent includes size information of an area represented by the position information, different extents may have different sizes.

As a result of carrying out the data recording processing sequence 120, files P001.JPG, P002.JPG and P003.JPG are recorded in the directory (see FIG. 6, part (a)). The entry numbers of files P001.JPG, P002.JPG and P003.JPG are "1", "2" and "3", respectively.

As a result of carrying out the data recording processing sequence 120, the position information of the extent of file P001.JPG is recorded in the entry of entry No. 1, and the position information of the extent of file P002.JPG is recorded in the entry of entry No. 2. In the entry of entry No. 3, the position information of the extent of the first half of file P003.JPG and entry No. 4 representing the position information of the entry of the second half of file P003.JPG are recorded. In the entry of entry No. 4, the position information of the extent of the second half of file P003.JPG is recorded.

While the completion processing sequence 130 is being carried out, the file system is referred to, and the replacement information (see FIG. 4) is received and the extent including the pre-replacement address A5 is searched for from the extent table. The extent of entry No. 3 includes address A5. Thus, it is appreciated that this extent has been spared. As a result of carrying out the completion processing sequence 130, the data recorded in the area represented by address A9 is copied to the area represented by address A7. This is the copying processing of the data recorded in the spare area. For updating the file management information, the position information of the extent of entry No. 3 is changed to address A7 (see FIG. 6, part (b)).

As described above, a data structure is used by which the position information of files is managed in the form of a table and extent position information is recorded for each entry. In this manner, the position information in the file management information corresponding to an address of an area in which data has been recorded as a spare area can be easily searched for regarding each such address. In addition, the position information of the file corresponding to the pre-replacement information can be updated to the position information of the post-replacement area or the position information of an area to which the data has been copied.

In the above-described method, in the step of searching for the position information of the file corresponding to the position information of the pre-replacement area of the data, a corresponding file is searched for based on the position information of the pre-replacement area. Alternatively, it may be checked, for each file recorded on the optical disc, whether the area in which the file is recorded includes a post-replacement area.

According to the first example of the present invention, the drive control unit performs defect management processing. Therefore, the performance at the time of data recording can be improved even for an optical disc in which no spare area is present. Usually, the number of defective sectors detected in an optical disc is small and thus the amount of data recorded in a spare area is small. Therefore, in the completion processing, the number of times that data is copied, or the number of times that file management information is updated, is small. For these reasons, the time required for the completion processing is not a serious issue.

According to the first example of the present invention, spare areas can be assigned closer to an area in which data is to be recorded, as compared to the method of assigning spare areas in an inner area or an outer area of the optical disc. Thus, the seek time of the pickup required for recording data in a spare area can be reduced.

According to the first example of the present invention, when only a few number of used areas are left in the assigned spare areas as a result of data being recorded in the spare areas, another spare area can be assigned. As compared to the conventional method of setting spare areas in an area managed by the drive control unit, the recordable areas can be used more efficiently.

According to the first example of the present invention, the data which has been recorded in a spare area is copied to an area outside the spare area, so that the spare area is released as an unused area. This makes it easy to use the spare area for the next data recording.

According to the first example of the present invention, the data which has been recorded in a spare area can be copied to a preset dedicated area. This shortens the access time for data reproduction.

The recording position information in the file regarding the position information of the pre-replacement area in the replacement information is searched for based on the file management information, and the position information of the corresponding file is changed to the position information of the post-replacement area or the position information of the area to which the data has been copied. In this manner, the file management information of the recording method can be updated according to the first example of the present invention. In the recording method of the first example of the present invention, the file management information may have a desired structure (a structure by which the position information of a file is managed in the form of a table and extent position information is recorded for each entry). In this case, the file management information can be updated efficiently.

The file system may be a system by which file management information is recorded in a plurality of areas on the disc in a disperse manner (for example, UDF) or a system by which file management information is managed as a one, continuous table (for example, FAT). The recording method according to the first example of the present invention may include the step of holding a list of files changed by the file system and searching for the position information of the pre-replacement area from the file management information of the file included in the list. In this case, the time required for the completion processing can be shortened.

According to the first example of the present invention, an area including a few defective sectors may be assigned as a spare area. Thus, the frequency at which the data is copied due to the defective sectors in the spare area can be reduced.

According to the first example of the present invention, the drive control unit may record, in the defect management list, the information on a logical sector detected as a defective sector. In this case, the data can be recorded efficiently.

EXAMPLE 2

In a second example of the present invention, an optical disc having a sparing table recorded thereon will be described.

Figure 7:
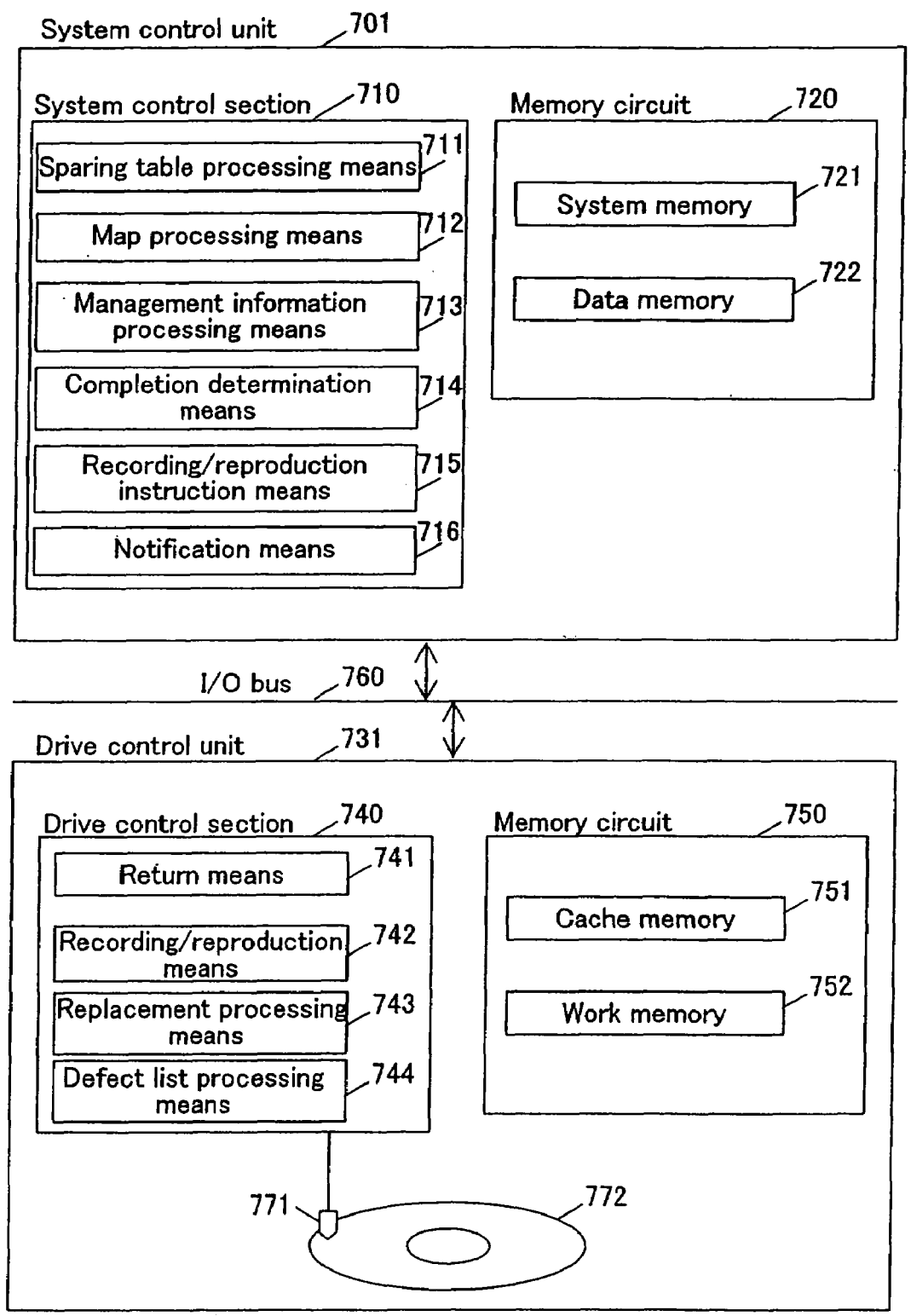
FIG. 7 shows an information recording system 700 according to a second example of the present invention.

FIG. 7 shows an information recording system 700 according to the second example of the present invention.

The information recording system 700 includes a system control unit 701, and a drive control unit 731 on which an optical disc 772 is mountable. The system control unit 701 and the drive control unit 731 are connected to an I/O bus 760.

The information recording system 700 is, for example, a personal computer-based system or a consumer-use optical disc video recorder. In the case where the information recording system 700 is a personal computer-based system, the system control unit 701 is a main body of the personal computer, and the drive control unit 731 is an optical disc drive as a peripheral device. In the case where the information recording system 700 is a consumer-use optical disc video recorder, the system control unit 701 is, for example, a system control board, and the drive control unit 731 is, for example, an optical disc drive having a minimum necessary structure.

The system control unit 701 includes a system control section 710 and a memory circuit 720 for temporarily storing data.

The system control section 710 is, for example, a microcomputer or a CPU. The system control section 710 includes sparing table processing means 711 for instructing the drive control unit 731 to read and write the sparing table, map processing means 712 for changing between a sparing map and a partition map, management information processing means 713 for generating or changing management information, completion determination means 714 for determining whether or not data recording has been completed, recording/reproduction instruction means 716 for instructing the drive control unit 731 to record and/or reproduce data, and notification means 717 for notifying the drive control unit 731 of various information.

The memory circuit 720 includes a system memory 721 and a data memory 722 for temporarily storing data. The system memory 721 is a work memory used, for example, by the system control section 710 to perform arithmetic operation processing or analysis processing.

The drive control unit 731 includes a drive control section 740, a memory circuit 750 for temporarily storing data, and a pickup 771.

The drive control section 740 is, for example, a microcomputer or a DSP. The drive control section 740 controls the pickup 771 to record data on, and/or reproduce data from, the optical disc 772.

The drive control section 740 includes return means 741 for returning data to the system control unit 701, recording/reproduction means 742 for recording data on, and/or reproducing data from, a prescribed area, substitution processing means 743 for performing verification processing, and defect list processing means 744 for registering position information of a defective sector in a defect management list. The drive control section 740 is produced as, for example, a one-chip LSI (semiconductor integrated circuit) or a part thereof. In the case where the drive control section 740 is produced as a one-chip LSI, the production process of the drive control unit 731 and the information recording system 700 can be made easy.

The memory circuit 750 includes a cache memory 751 used for efficiently processing data which is recorded and/or reproduced by the drive control section 740 and a work memory 752 used for performing arithmetic operations or the like.

The memory circuit 720 and the memory circuit 750 may be formed by dividing one physical memory circuit into a plurality of memory areas. In that case, one of the plurality of memory areas is assigned as the memory circuit 720 and another one of the plurality of memory areas is assigned as the memory circuit 750.

Figure 8:
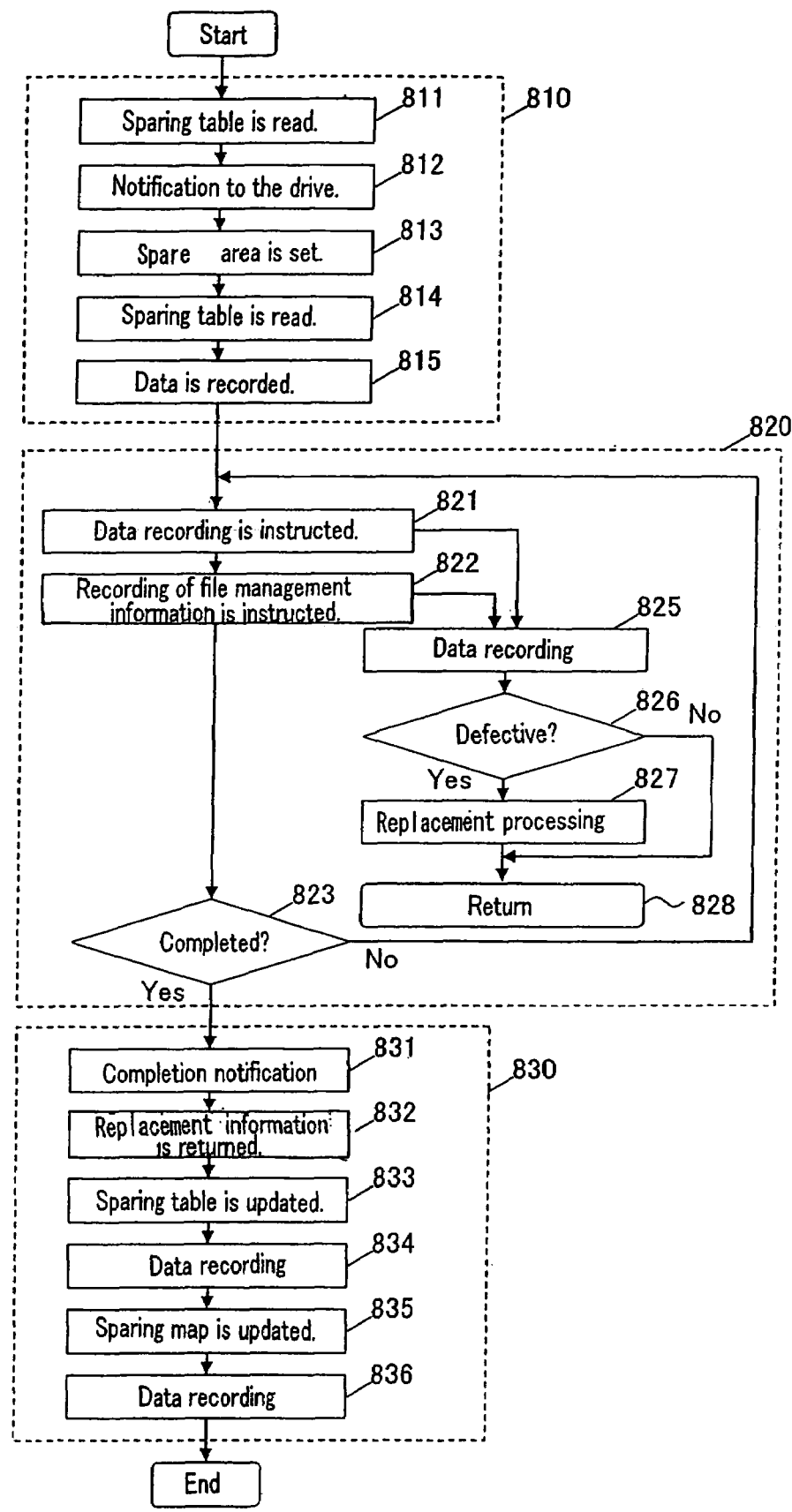
FIG. 8 is a flowchart illustrating a recording method according to the second example of the present invention.

FIG. 8 shows a recording method according to the second example of the present invention. The recording method according to the second example of the present invention includes a spare area assignment processing sequence 810, a data recording processing sequence 820, and a completion processing sequence 830.

Figure 9:
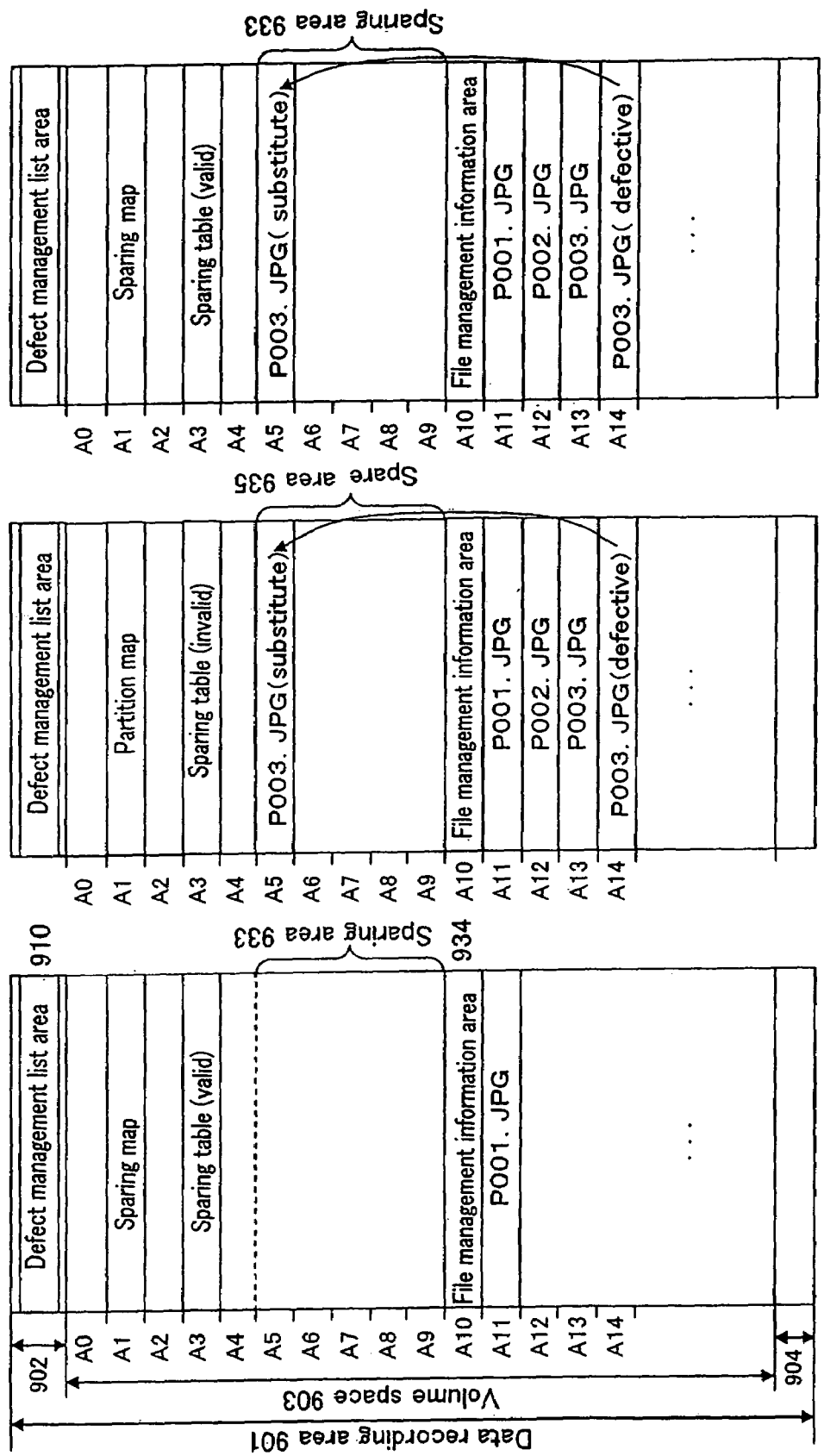
FIG. 9 shows a data structure recorded on an optical disc by the recording method according to the second example of the present invention.

FIG. 9 shows a data structure recorded on the optical disc by the recording method according to the second example of the present invention.

FIG. 9, part (*a*), shows a data structure recorded on the optical disc before the spare area assignment processing sequence 810 is performed. Before the spare area assignment processing sequence 810 is performed, the system control unit 701 manages sparing areas 933.

A recording area of the optical disc includes a data recording area 901. The data recording area 901 is a data recordable area of the optical disc. The data recording area 901 includes a lead-in area 902 and a lead-out area 904 which are managed by the drive control unit 731 and a volume space 903 which is managed by the system control unit 901.

In the lead-in area 902, a defect management list area 910 is assigned. The drive control unit 731 records a defect management list in the defect management list area 910. The defect management list includes defect management information (for example, a list of addresses of defective sectors which are detected in the volume space 903). In the volume space 903, an address is assigned for each logical sector. In this example, for the sake of simplicity, explanation will be done for each group of areas designated as address A0 through A*n*. Data is recorded in the volume space 903 as a file, and the file is managed by file management information. The file management information is recorded in a file management information area 934 represented by address A10. At address A11, file P001.JPG is pre-recorded.

In an area represented by address A1 (a part of a volume structure), a sparing map is recorded. The sparing map shows that a sparing table is recorded in an area represented by address A3.

A system driver conformed to the UDF recognizes the sparing table and thus detects a defective sector at the time of data recording. Then, the system driver records data of an ECC (Error Correction Code) block including the defective sector in an ECC block in a sparing area.

Figures 10, 11:
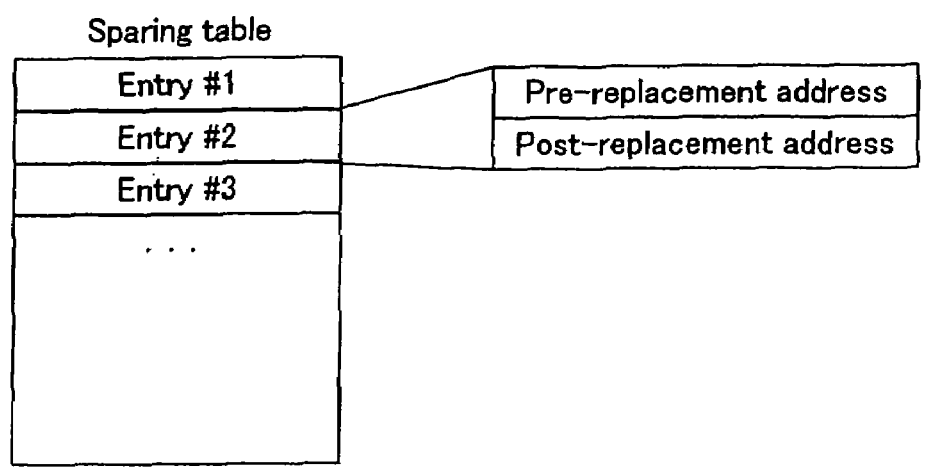
FIG. 10 shows a data structure of a sparing table.
FIG. 11 shows main data fields of a partition map and a sparing map.

FIG. 10 shows a data structure of the sparing table. In each of a plurality of fields, an entry number is registered. Each entry has a fixed length of 8 bytes, and each entry indicates a pre-replacement address and a post-replacement address. Each time data is recorded in a spare area, an entry is registered in the sparing table.

An ECC block in a DVD-RW disc includes 16 continuous logical sectors, and a packet which is a recording unit of DVD-RW corresponds to one ECC block.

With reference to FIG. 9, a data structure recorded on the optical disc by the recording method of the second example of the present invention.

FIG. 9, part (*b*), shows a data structure recorded on the optical disc after the data recording processing sequence 820 is performed. After the data recording processing sequence 820 is performed, the drive control unit 731 manages the spare areas 933. The information recording system 700 refers to the file system, and thus records file P002.JPG in an area represented by address A12 and records file P003.JPG in an area represented by address A13 and an area represented by address A14.

File P003.JPG has a large size. Therefore, the first half of file P003.JPG is recorded in the area represented by address A13 and the second half thereof is recorded in the area represented by address A14. The first half and the second half of file P003.JPG should be recorded continuously. However, a verification of the data recorded by the drive control unit 731 shows that the area represented by address A14 is defective, and thus the first half of file P003.JPG is recorded in an area represented by address A5 as a spare area.

FIG. 9, part (*c*), shows a data structure recorded on the optical disc after the completion processing sequence 830 is performed. After the completion processing sequence 830 is performed, the system control unit 701 manages the sparing areas 933.

The information recording system 700 refers to the file system, and thus obtains mapping information and registers the mapping information on the sparing table recorded in an area represented by address A3. The mapping information indicates that the data, which should be recorded in the area represented by address A14, has actually been recorded in the area represented by address A5 which is a sparing area.

Then, the partition map is changed (corrected) to a sparing map, and a newly recorded sparing table is designated. Thus, the spare areas 935 are recognized as sparing areas 933 which are managed by the system control unit 701 with reference to the file system.

Hereafter, the recording method according to the second example of the present invention will be described step by step with reference to FIGS. 8 and 9.

The spare area assignment processing sequence 810 will be described in detail below.

The spare area assignment processing sequence 810 is carried out by steps 811 through 815. The spare area assignment processing sequence 810 is a pre-processing sequence of data recording. In the spare area assignment processing sequence 810, the sparing areas 933 managed by the system control unit 701 are changed to the spare areas 935 managed by the drive control unit 731.

Step 811: The sparing table processing means 911 reads a sparing map recorded in an area represented by address A1 to obtain position information of the position at which the sparing table is recorded, and reads a sparing table recorded in the area represented bar address A3.

Step 812: The notification means 716 notifies the drive control unit 731 of the position information of the areas represented by addresses A5 through A9 (sparing areas 933) and replacement information which indicates the address, the data of which is recorded in a spare area among the sparing areas.

Step 813: The drive control unit 731 sets the notified sparing areas 933 as the spare areas 935. The replacement information is also notified. Therefore, when data is recorded in a spare area among the sparing areas, the drive control unit 731 records the data in a different area as a spare area.

Step 814: The map processing means 712 instructs the drive control unit 731 to rewrite the sparing map to usual partition map having no sparing table information.

Step 815: The drive control unit 713 follows the instruction to record the partition map.

As described above, the system control unit 701 notifies the drive control unit 731 of the position information on the sparing areas and the replacement information. Owing to this notification, the drive control unit 731 itself can record data in a spare area.

FIG. 11 shows main data fields included in the partition map and the sparing map.

FIG. 11, part (*a*), shows a main data field of the sparing map, and part (*b*) shows a main data field of the partition map.

Hereinafter, a data structure of the sparing map and a data structure of the partition map will be described in detail with reference to FIG. 11.

The sparing map and the partition map have a field which shows a map type thereof. In the field showing the map type, "2" or "1" of recorded. "2" indicates that the map is a sparing map, and "1" indicates that the map is a partition map. By referring to this field, the map type can be determined.

In the field showing the partition identification number, an identification number of the partition indicated by the map is recorded. Accordingly, the partition identification number has the same value in both the sparing map and the partition map. In the field showing the packet length, the size of the packet is recorded.

The field showing the length and the position of the sparing table shows the location which is assigned as the sparing table. When the sparing map is recorded, it is understood that the spring table is recorded. Therefore, a file system driver conformed to the conventional UDF can use the information of the sparing table to perform defect management.

In the information recording method according to the second example of the present invention, the sparing map may be rewritten to the partition map. In this case, even a file system which does not support the sparing table can record data. Since the drive control unit 731 performs defect management, the performance at the time of recording is enhanced.

In the case where a file system driver having the function of notifying the drive control unit of the replacement information performs data recording/reproduction, it is not necessary to rewrite the sparing map to the partition map. The reason is that such a file system driver recognizes that the drive control unit performs substitution processing.

With reference to FIGS. 8 and 9 again, a recording method according to the second example of the present invention will be described step by step.

The data recording processing sequence 820 will be described in detail below.

The data recording processing sequence 820 is carried out by steps 821 through 828. In the data recording sequence 820, the drive control unit 731 performs defect management processing while recording the data recorded in the data memory 722.

Step 821: When an instruction from the user or an application requires the data recorded in the data memory 722 to be recorded on the optical disc, a free area which is necessary for recording the data is searched for, and the recording/reproduction instruction means 715 instructs the drive control unit 731 to record the data recorded in the data memory 722 in the free area which has been found.

Step 825: The recording/reproduction means 742 records the data transferred from the data memory 722 in the instructed free area. In this step, the data transferred from the data memory 722 is once stored in the cache memory 751 in the drive control unit 731 and the recording processing is temporarily in a wait state. The reason is that for recording a plurality of pieces of data in continuous areas, it is faster to record data continuously than to record data one by one. FIG. 8 shows that data reading and defect management are performed sequentially, but actually, data recording, data reading, and defect management are scheduled to be executed parallel in units of related pieces of data. Accordingly, the defect management performed by the drive control unit 731 realizes higher performance at recording than the defect management performed with reference to the file system.

Step 826: The substitution processing means 743 performs verification processing. More specifically, the substitution processing means 743 reads the recorded data and compares the read data with the pre-recording data. When the recorded data cannot be read or is different from the pre-recording data, the logical sector in which the data has been recorded is determined as a defective sector. When an error occurs while data is recorded, the logical sector in which the data is to be recorded is determined as a defective sector.

When the logical sector is determined as being defective (Yes), the processing proceeds to step 827. When the logical sector is determined as being not defective (No), the processing proceeds to step 828.

Step 827: The data to be recorded is recorded in an unused area among the spare areas 935. The defect list processing means 744 registers position information of the defective sector in the defect management list which is recorded in the defect management list area 910.

For recording data in a spare area, verification processing is performed. More specifically, the recorded data is read and the read data is compared with the pre-recording data. When the recorded data cannot be read or is different from the pre-recording data, the data is recorded in a different area among the spare areas.

When the data is instructed to be recorded in the logical sector registered in the defect management list, the drive control unit 731 may directly record the data in a spare area instead of recording the data in the logical sector. In this case, the data can be efficiently recorded. Mapping information, indicating the address of the logical sector in which the data is to be recorded and the address of the logical sector in the spare area in which the data has actually been recorded, is held in the work memory 752.

The information recording system 700 repeats steps 821 and 825 through 828. When the data recording is completed, the processing proceeds to step 822. In the repetition loop of steps 821 and 825 through 828, step 828 means the return to step 821.

Step 822: The management information processing means 713 creates management information on the recording position of the data, the file name, and the like in order to manage the recorded data in the form of a file. Even if the drive control unit 731 records data in a spare area at this point, the file system is not aware thereof. Therefore, the management information of the file is created as if the data was recorded at an address instructed by the file system. The recording/reproduction instruction means 715 instructs the drive control unit 731 to record the data in a prescribed logical sector in order to update the file management information.

The information recording system 700 repeats steps 822 and 825 through 828. When the recording of the file management information is completed, the processing proceeds to step 823. In the repetition loop of steps 822 and 825 through 828, step 828 means the return to step 822.

Step 823: The completion determination means 714 determines whether or not the data recording has been completed. When, for example, the user instructs the optical disc to be removed, the completion determination means 714 determines that the data recording has been completed.

As described above, the information recording system 700 refers to the file system, and records file P002.JPG in the area represented by address A12 and records file P003.JPG in the area represented by address A13 and the area represented by address A14 (see FIG. 9, part (b)).

File P003.JPG has a large size. Therefore, the first half of file P003.JPG is recorded in the area represented by address A13 and the second half thereof is recorded in the area represented by address A14. The first half and the second half of file P003.JPG should be recorded continuously. However, a verification of the data recorded by the drive control unit 731 shows that the area represented by address A14 is defective, and thus the first half of file P003.JPG is recorded in the area represented by address A15 as a spare area (see FIG. 3, part (b)).

The completion processing sequence 830 will be described in detail below.

The completion processing sequence 730 is carried out by steps 831 through 836. In the completion processing sequence 830, when data is recorded in a spare area, the sparing table managed by the file system is updated, and the partition map is changed to the sparing map.

Step 831: Based on the determination of the completion determination means 714, the notification means 716 notifies the drive control unit 731 that the data recording processing has been completed.

Step 832: The return means 741 in the drive control unit 731 returns the mapping information of recording in the spare area, which has been held in the work memory 752, to the system control unit 701.

Step 833: Based on the returned mapping information, the sparing table processing means 711 in the system control unit 701 updates the sparing table. The recording/reproduction instruction means 715 instructs the drive control unit 731 to record the data in the updated sparing table.

Step 834: The recording/reproduction means 742 in the drive control unit 731 follows the instruction of the recording/reproduction instruction means 715 to record the data.

Step 835: The mapping processing means 712 instructs the drive control unit 731 to change the partition map to the sparing map.

Step 836: The recording/reproduction means 742 in the drive control unit 731 follows the instruction of the map processing means 712 to record the data.

As described above, the information recording system 700 refers to the file system to obtain the mapping information and register the mapping information in the sparing table which is recorded in the area represented by address A3. The mapping information shows that the data which is to be recorded in the area represented by address A14 has actually been recorded in the area represented by address A5. Then, the partition map is changed to a sparing map, and a newly recorded sparing table is designated. Thus, the spare areas 935 are recognized as sparing areas 933 which are managed by the system control unit 701 with reference to the file system.

As described above, the sparing table can be updated referring to the file system. Therefore, even if the drive control unit 731 records data while performing defect management, the sparing table recorded as a data structure of UDF can be matched to the defect management information.

The position information and replacement information of the sparing area which is exchanged between the system control unit 701 and the drive control unit 731 may be in the form of a sparing table or any other form which can easily be handled by the drive control unit 731.

According to the second example of the present invention, the drive control unit performs defect management processing. Therefore, for an optical disc having a sparing table recorded thereon, the performance at the time of data recording can be improved.

The present invention has been described by way of preferable examples thereof. It is not intended that the present invention is limited to these examples. It is understood that the scope of the present invention is construed as being only limited by the claims. It is understood that those skilled in the art can work the equivalents of the present invention based on the description of the present invention and the technological common knowledge. The patents, patent applications and documents referred to in this specification are herein incorporated by reference and construed as being specifically described in this specification.

INDUSTRIAL APPLICABILITY

According to the present invention, the drive control unit receives, from the system control unit, position information indicating the position of the spare area assigned in the volume space. Based on the position information, the drive control unit records information, which is to be recorded in a defective area, in the spare area.

Thus, it is not necessary to assign a spare area in the lead-in area. This enhances the freedom of the space occupied by the spare areas.

In addition, it is not necessary for the system control unit to control the drive control unit such that the drive control unit records information, which is to be recorded in a defective area, in a spare area. This decreases the number of times that the system control unit and the drive control unit exchange information.

The invention claimed is:

1. An information recording method for recording information on a recording medium having a volume space by a system including a drive control unit and a system control unit, the method comprising the steps of:
   (a) notifying the drive control unit, by the system control unit, of position information, wherein the position information indicates a position of a spare area assigned in the volume space;
   (b) recording information, by the drive control unit, in the spare area based on the notified position information, wherein the information is intended to be recorded in a defective area;
   (c) generating replacement information, by the drive control unit, on the position at which the information is recorded in the spare area, and notifying the system control unit of the replacement information;
   (d) instructing the drive control unit, by the system control unit, to change management information for managing the information recorded on the recording medium based on the notified replacement information; and
   (e) changing the management information based on the instruction by the drive control unit.

2. An information recording method according to claim 1, wherein step (a) further includes the step of assigning the spare area in the volume space by the system control unit.

3. An information recording method according to claim 2, wherein step (a) further includes the step of unit selecting an area having fewer defective areas in the volume space as the spare area by the system control unit.

4. An information recording method according to claim 3, wherein:
   the recording medium has a defect management list managed by the drive control unit recorded thereon; and the method further includes the step of registering position information which indicates the defective areas in the defect management list by the drive control unit.

5. An information recording method according to claim 1, wherein the management information is file management information for managing a file recorded on the recording medium.

6. An information recording method according to claim 5, wherein the file management information records position information of each of extents in the form of a table, and an extent is a continuous area in which a file is recorded.

7. An information recording method according to claim 1, wherein:
step (d) further includes the step of copying the information which is recorded in the spare area, in an area which is a part of the volume space and is different from the spare area, based on the notified replacement information by the system control unit; wherein
the spare area is managed by the system control unit.

8. An information recording method according to claim 1, wherein step (d) further includes the step of copying the information which is recorded in the spare area, in a prescribed area which is a part of the volume space, based on the notified replacement information by the system control unit.

9. An information recording method according to claim 1, further comprising the steps of:
searching for position information of a pre-replacement area regarding the replacement information; and
changing the found position information of the pre-replacement area to information which indicates a recording position at which the information is recorded in the spare area.

10. An information recording method according to claim 9, wherein the system control unit holds the changed information indicating the recording position.

11. An information recording method according to claim 1, wherein the management information is a sparing table for recording the replacement information.

12. An information recording method according to claim 11, further including the steps of:
instructing the drive control unit, by the system control unit, to change a partition map after step (a) in order to match the recording medium to a recording medium having the sparing table not recorded thereon; and
changing the partition map, by the drive control unit, in accordance with the instruction to change.

13. An information recording method according to claim 11, wherein:
the recording medium has a defect management list managed by the drive control unit; and
the method further includes the step of registering position information in the defect management list by the drive control unit wherein the position information indicates a position of a defective area detected when the information is recorded.

14. A system for recording information on a recording medium having a volume space, the system comprising:
a drive control unit; and
a system control unit;
wherein:
the system control unit comprises:
(a) means for notifying the drive control unit of position information which indicates a position of a spare area assigned in the volume space;
the drive control unit comprises:
(b) means for recording information, which is to be recorded in a defective area, in the spare area based on the notified position information; and
(c) means for generating replacement information on a position at which the information is recorded in the spare area, and notifying the system control unit of the replacement information;
the system control unit further comprises:
(d) means for instructing the drive control unit to change management information for managing the information recorded on the recording medium based on the notified replacement information; and
the drive control unit further comprises:
(e) means for changing the management information based on the instruction.

15. A system according to claim 14, wherein the means for notifying the drive control unit further includes means for assigning the spare area in the volume space.

16. A system according to claim 14, wherein the management information is file management information for managing a file recorded on the recording medium.

17. A system according to claim 14, wherein the management information is a sparing table for recording the replacement information.

18. An information recording method for recording information on a recording medium having a volume space by a drive control unit structured so as to receive notification from a system control unit, the method comprising the steps of:
(a) recording information, by the drive control unit, in a spare area, based on position information which indicates a position of the spare area pre-assigned in the volume space, wherein the information is intended to be recorded in a defective area and the position information is notified by the system control unit;
(b) generating replacement information, by the drive control unit, on the position at which the information is recorded in the spare area, and notifying the system control unit of the replacement information; and
(c) changing the management information, by the drive control unit, in accordance with an instruction received from the system control unit which instructs the drive control unit to change management information for managing the information recorded on the recording medium based on the notified replacement information.

19. An information recording method according to claim 18, wherein the management information is file management information for managing a file recorded on the recording medium.

20. An information recording method according to claim 18, wherein the management information is a sparing table for recording the replacement information.

21. A drive control unit for recording information on a recording medium having a volume space, the drive control unit being structured so as to receive notification from a system control unit, the drive control unit comprising:
(a) means for recording information, which is to be recorded in a defective area, in a spare area, based on position information which indicates a position of a spare area pre-assigned in the volume space, the position information being notified by the system control unit;
(b) means for generating replacement information on the position at which the information is recorded in the spare area, and notifying the system control unit of the replacement information; and
(c) means for changing the management information in accordance with an instruction received from the system control unit which instructs the drive control unit to change management information for managing the information recorded on the recording medium based on the notified replacement information.

22. A drive control unit according to claim 21, wherein the management information is file management information for managing a file recorded on the recording medium.

23. A drive control unit according to claim 21, wherein the management information is a sparing table for recording the replacement information.

24. A semiconductor integrated circuit for controlling recording of information on a recording medium having a volume space, the semiconductor integrated circuit being structured so as to receive notification from a system control unit, the semiconductor integrated circuit comprising:
(a) means for recording information, which is to be recorded in a defective area, in a spare area, based on position information which indicates a position of a spare area pre-assigned in the volume space, the position information being notified by the system control unit;
(b) means for generating replacement information on the position at which the information is recorded in the spare area, and notifying the system control unit of the replacement, information; and
(c) means for changing the management information in accordance with an instruction received from the system control unit which instructs the semiconductor integrated circuit to change management information for managing the information recorded on the recording medium based on the notified replacement information.

* * * * *